L. E. KNOTT.
APPARATUS FOR DETERMINING THE AMOUNT OF CARBON DIOXID IN THE AIR.
APPLICATION FILED DEC. 30, 1910.
1,040,356.
Patented Oct. 8, 1912.
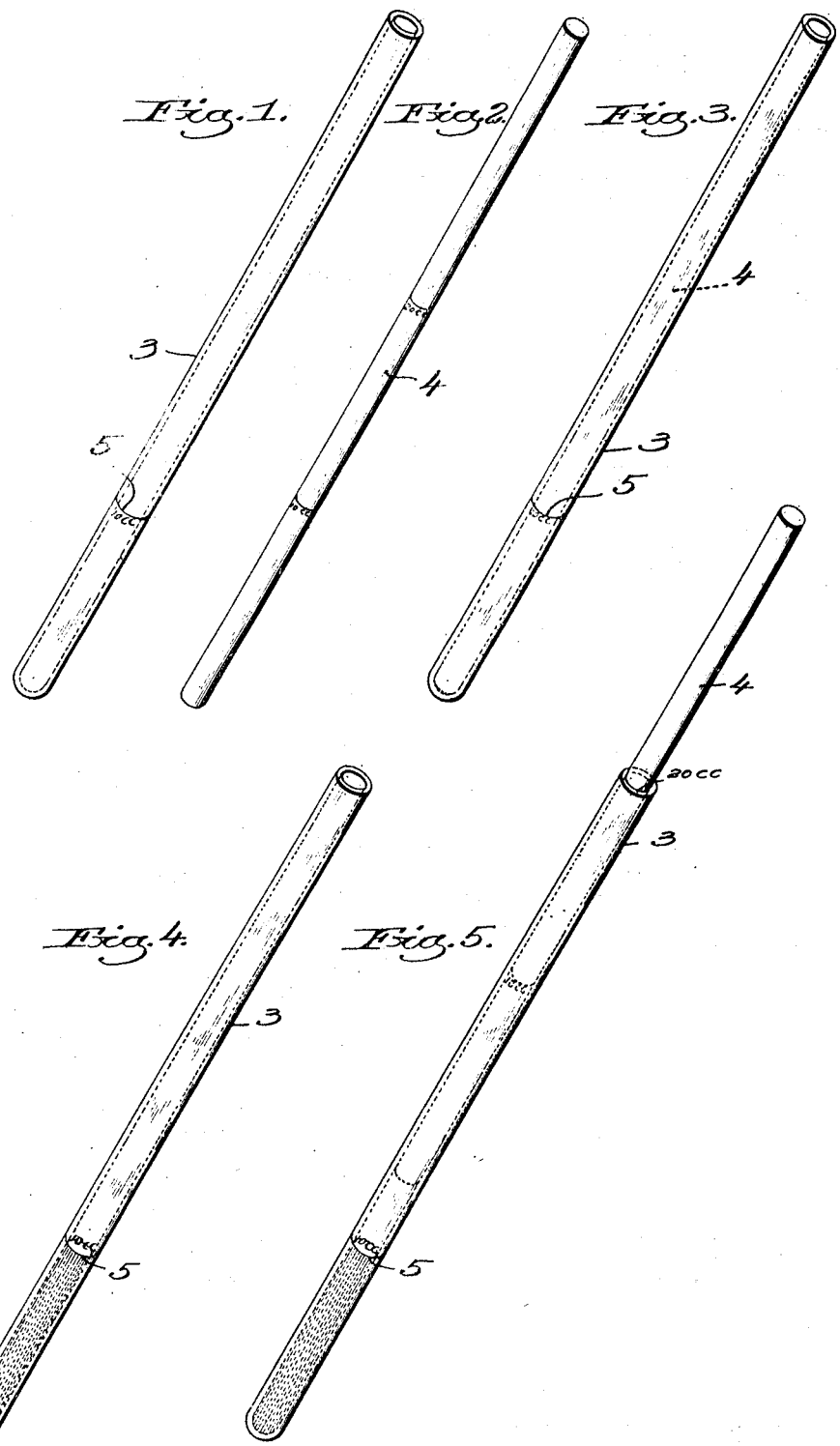

UNITED STATES PATENT OFFICE.

LOUIE E. KNOTT, OF BOSTON, MASSACHUSETTS; ASSIGNOR TO L. E. KNOTT APPARATUS COMPANY, OF BOSTON, MASSACHUSETTS, A CORPORATION OF MASSACHUSETTS.

APPARATUS FOR DETERMINING THE AMOUNT OF CARBON DIOXID IN THE AIR.

1,040,356.　　　　Specification of Letters Patent.　　Patented Oct. 8, 1912.

Application filed December 30, 1910. Serial No. 600,152.

*To all whom it may concern:*

Be it known that I, LOUIE E. KNOTT, a citizen of the United States, residing at Boston, county of Suffolk, and State of Massachusetts, have invented an Improvement in Apparatus for Determining the Amount of Carbon Dioxid in the Air, of which the following description, in connection with the accompanying drawing, is a specification, like letters on the drawing representing like parts.

This invention has for its object to provide a novel device by which the amount of carbon dioxid ($CO_2$) in the air can be readily determined.

The device is especially useful in testing the air to determine the condition thereof in school-houses, halls, and other places where a large number of people gather.

In practising my invention I make use of a test solution which is capable of absorbing carbon dioxid. The solution is preferably of such a character that in its normal state it has a slight permanent coloration, but will lose its color and become colorless as it absorbs carbon dioxid. The device which I use includes a test tube having a known capacity and provided with graduation marks and a rod plunger of a size to fit the interior of the test tube, and also provided with graduation marks. The manner in which these elements are used will be more fully hereinafter described and then pointed out in the claims.

Referring now to the drawings wherein is shown an apparatus embodying my invention and the manner in which it is used, Figure 1 illustrates the graduated test tube; Fig. 2 is a rod or plunger; Fig. 3 shows the rod or plunger inserted into the test tube for the purpose of displacing the air therein; Fig. 4 shows the test tube with the predetermined quantity of test solution therein: Fig. 5 shows the plunger partly inserted into the test tube for the purpose of displacing a predetermined quantity of air therein.

The elements of the device comprise the test tube 3 and a rod or plunger 4. The test tube has a known capacity and is graduated. It is sufficient for the purposes of the invention that the test tube be provided with one graduation only, as shown at 5, which graduation marks a certain volume, as, for instance, 10 cubic centimeters. The plunger has a diameter equal to the interior diameter of the test tube, so that when the plunger is inserted into the tube it completely fills the latter. The plunger may conveniently be of the same length as the test tube, although this is not absolutely essential. Said plunger is graduated in such a way that the graduation marks indicate the cubic volume of certain portions of the plunger. While it would be possible to provide the plunger with a greater or less number of graduations, yet I find that for all practical purposes it is sufficient if the plunger is graduated to indicate 10 and 20 centimeter volumes, as shown in Fig. 2.

The carrying out of the invention also involves the use of a test solution which is of a nature that will readily absorb carbon dioxid. The solution preferably is one which normally has a slight color, but which loses its color as it absorbs carbon dioxid. A phenolphtalein solution has the above-noted characteristics and a suitable test solution can be made by adding a few drops of phenolphtalein solution to 100 cubic centimeters of pure water, and also adding if necessary a few drops of pure lime water to obtain the slight permanent coloration.

In using the apparatus the first step is to fill the test tube with the air which is to be tested. This is done by inserting the plunger 4 into the test tube to drive out therefrom all the air therein, and then placing the test tube in the room or compartment containing the air to be tested. The plunger is then withdrawn from the test tube, and as it is withdrawn, the air from the room in which the test tube is will find its way into the test tube. A predetermined quantity, say, for instance, 10 cubic centimeters, of the test solution is then poured into the test tube, this operation displacing 10 cubic centimeters of the air in the test tube. The total volume or capacity of the test tube is known, and therefore it can be readily determined how many cubic centimeters of air still remain in the test tube after the solution has been added. The person making the test then places his thumb over the mouth of the test tube and violently shakes the latter, thereby thoroughly mingling the air within the tube and the test solution. During this agitation all the carbon dioxid in the air is absorbed by the solution. If the solution still remains colored at this time, the operator inserts the plunger into the test tube for a distance sufficient to displace a known quantity of the air therein. This can be readily accomplished because of the fact that the plunger is graduated, and by inserting the plunger into the test tube up to the 10 cubic centimeter or 20 cubic centimeter graduation, it is possible to displace 10 or 20 cubic centimeters of air. When the plunger is withdrawn a quantity of air from the room or compartment in which a test is being made is again introduced into the test tube, and when this has been done, the test tube is closed by the thumb of the operator or some other stopper, and is again agitated to thoroughly mingle the air and the solution, during which time the carbon dioxid in the air is absorbed by the solution. If the solution still remains colored, the plunger is again inserted in the test tube to displace a known volume of air and is then withdrawn permitting this known volume of air from the room or compartment to be again introduced into the test tube. The test tube is again closed and shaken, and this operation is repeated until the solution in the test tube has lost its color and has become colorless. The total amount of air which has been introduced into the test tube and subjected to the action of the test solution therein can be readily computed and the test will show the number of cubic centimeters of air which it has been required to use to reduce the 10 cubic centimeters of test solution to the colorless state. The amount of carbon dioxid necessary to effect this change in the 10 cubic centimeters of test solution will be given in a prepared table which it is expected will be furnished with the apparatus, and by referring to this table the amount of carbon dioxid which is in the total amount of air which has been subjected to the action of the test solution can be readily ascertained. It will be understood, of course that the table will be prepared to correspond to a test solution of the given character and if desired the table will state the exact number of drops of phenolphtalein solution to add to the hundred cubic centimeters of pure water. For example, supposing the total capacity of the test tube to be 40 cubic centimeters, then when the 10 cubic centimeters of solutions has been added, there will be 30 cubic centimeters of air which will be subjected to the action of the test solution during the first shaking or agitation of the test solution. If we assume that for the second shaking or agitation of the tube 20 cubic centimeters of air be displaced from the test tube and replaced by the air in the room, and for each subsequent shaking the same quantity of air is displaced from the test tube and replaced by the air in the room, and that it takes five shakes to render the solution in the test tube colorless, then the total amount of air which has been subjected to the action of the solution is 110 cubic centimeters, and by referring to the prepared table, it can be readily ascertained how much carbon dioxid there was per unit volume in the air of the room.

The apparatus is especially useful for determining the amount of carbon dioxid in school-houses, factories, halls, and other places where a large number of people congregate, for by means of it the condition of the air in the room can be very readily ascertained.

Having described my invention, what I claim as new and desire to secure by Letters Patent is:—

1. In an apparatus for determining the amount of carbon dioxid in the air, the combination with a test tube adapted to contain a predetermined quantity of test solution, of a rod or plunger having a diameter substantially equal to the interior diameter of the test tube whereby when the plunger is inserted into the test tube the air therein is expelled therefrom, said plunger having a graduation mark thereon to indicate the cubic volume of the portion of the rod between said graduation mark and the end whereby when said end of the rod is introduced into the test tube until the graduation mark registers with the end of the tube a certain known volume of air will be displaced from the tube.

2. In an apparatus for determining the amount of carbon dioxid in the air, the combination with a test tube of uniform diameter throughout and provided near its lower end with a graduation mark which shows the capacity of the tube below said mark, of a rod or plunger having a uniform diameter throughout its length and a diameter substantially equal to the interior diameter of the test tube whereby when the plunger is inserted into the test tube the air therein is expelled therefrom, said plunger having a plurality of graduation marks thereon, each indicating the cubic volume of the portion of the rod between said mark and the end.

In testimony whereof, I have signed my name to this specification, in the presence of two subscribing witnesses.

LOUIE E. KNOTT.

Witnesses:
S. T. KNOTT,
LOUIS C. SMITH.